United States Patent
Nakano

(10) Patent No.: US 10,312,734 B2
(45) Date of Patent: Jun. 4, 2019

(54) POWER SUPPLY APPARATUS, CONTROL METHOD, AND STORAGE MEDIUM

(71) Applicant: CANON KABUSHIKI KAISHA, Tokyo (JP)

(72) Inventor: Katsuya Nakano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1047 days.

(21) Appl. No.: 14/348,967

(22) PCT Filed: Dec. 5, 2013

(86) PCT No.: PCT/JP2013/007152
§ 371 (c)(1),
(2) Date: Apr. 1, 2014

(87) PCT Pub. No.: WO2014/103191
PCT Pub. Date: Jul. 3, 2014

(65) Prior Publication Data
US 2015/0303700 A1    Oct. 22, 2015

(30) Foreign Application Priority Data

Dec. 27, 2012    (JP) .................................. 2012-284436

(51) Int. Cl.
*H02J 5/00*    (2016.01)
*H02J 17/00*    (2006.01)
(Continued)

(52) U.S. Cl.
CPC ............ *H02J 50/12* (2016.02); *H02J 7/0004* (2013.01); *H02J 17/00* (2013.01)

(58) Field of Classification Search
CPC .. H02J 17/00; H02J 5/005; H02J 50/12; H02J 7/0004; H02J 7/025
See application file for complete search history.

(56) References Cited

U.S. PATENT DOCUMENTS 8,044,639 B2 * 10/2011 Tamegai ............... H02J 7/0055
                                                       307/43
8,265,556 B2 *  9/2012 Tekin .................. A61B 5/0022
                                                       455/41.1
(Continued)

FOREIGN PATENT DOCUMENTS

CN        102611207 A    7/2012
CN        104737416 A    6/2015
(Continued)

*Primary Examiner* — Rexford N Barnie
*Assistant Examiner* — E. O.
(74) *Attorney, Agent, or Firm* — Canon U.S.A., Inc. IP Division

(57) ABSTRACT

An power supply apparatus includes a first power supply unit configured to wirelessly supply power based on a first power supply method, a second power supply unit configured to wirelessly supply power based on a second power supply method different from the first power supply method, a communication unit configured to communicate with an electronic device, a selection unit configured to select one of the first and second power supply units based on a communication with the electronic device, and a control unit configured to perform a process to wirelessly supply power to the electronic device using the selected power supply unit, wherein the control unit controls the selection unit to select one of the first power supply unit and the second power supply unit depending on a state of the electronic device.

21 Claims, 6 Drawing Sheets

(51) Int. Cl.
  *H02J 7/02* (2016.01)
  *H02J 50/12* (2016.01)
  *H02J 7/00* (2006.01)

(56) References Cited

U.S. PATENT DOCUMENTS

| | | | | |
|---|---|---|---|---|
| 8,933,583 | B2* | 1/2015 | Uchida | H02J 7/025 |
| | | | | 307/11 |
| 9,391,671 | B2* | 7/2016 | Kim | H04B 5/0031 |
| 2008/0176115 | A1* | 7/2008 | Yamamiya | H01M 8/04014 |
| | | | | 429/421 |
| 2011/0140671 | A1* | 6/2011 | Kim | H02J 7/025 |
| | | | | 320/137 |
| 2011/0169338 | A1* | 7/2011 | Kozakai | H02J 5/005 |
| | | | | 307/104 |
| 2012/0268238 | A1* | 10/2012 | Park | G07F 15/006 |
| | | | | 340/5.8 |
| 2014/0210406 | A1* | 7/2014 | Na | H02J 5/005 |
| | | | | 320/108 |
| 2016/0134334 | A1* | 5/2016 | Park | H02J 5/005 |
| | | | | 307/104 |
| 2016/0288653 | A1* | 10/2016 | Tsukamoto | H02J 5/005 |

FOREIGN PATENT DOCUMENTS

| | | |
|---|---|---|
| JP | 2000-011105 A | 1/2000 |
| JP | 2008-295273 A | 12/2008 |
| JP | 2010-226836 A | 10/2010 |
| JP | 2012-205411 A | 10/2012 |

\* cited by examiner

[Fig. 1]
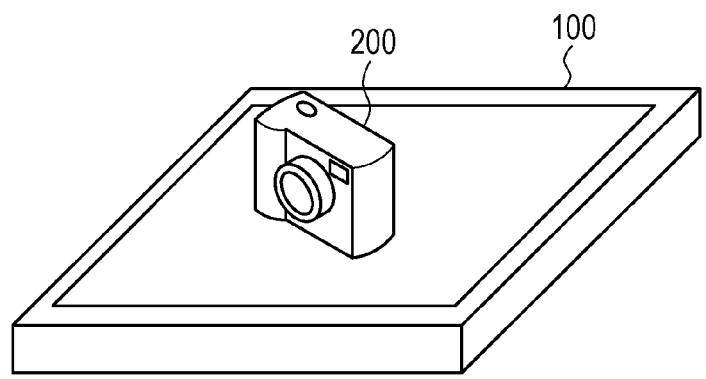

[Fig. 2]
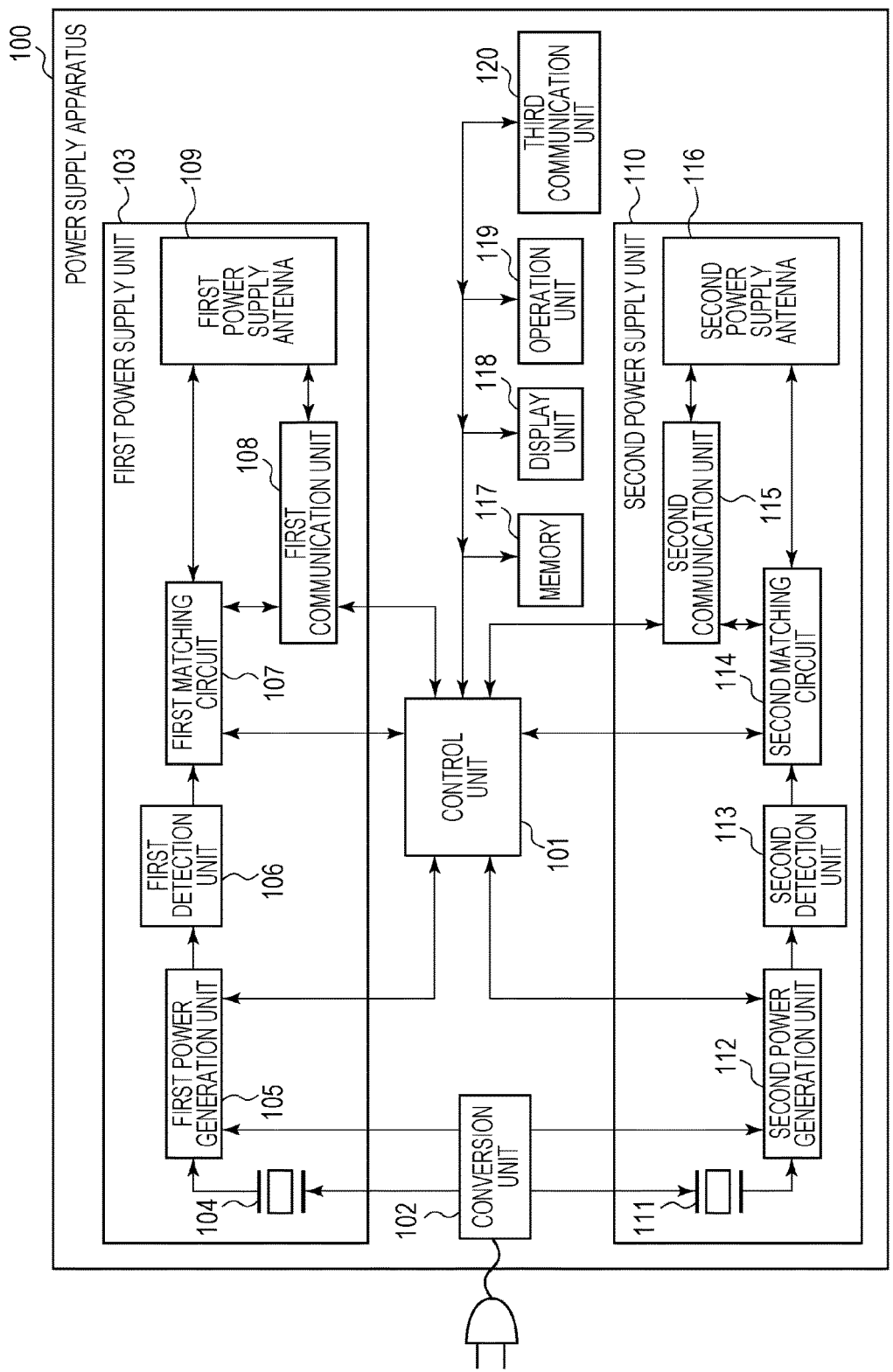

[Fig. 3]
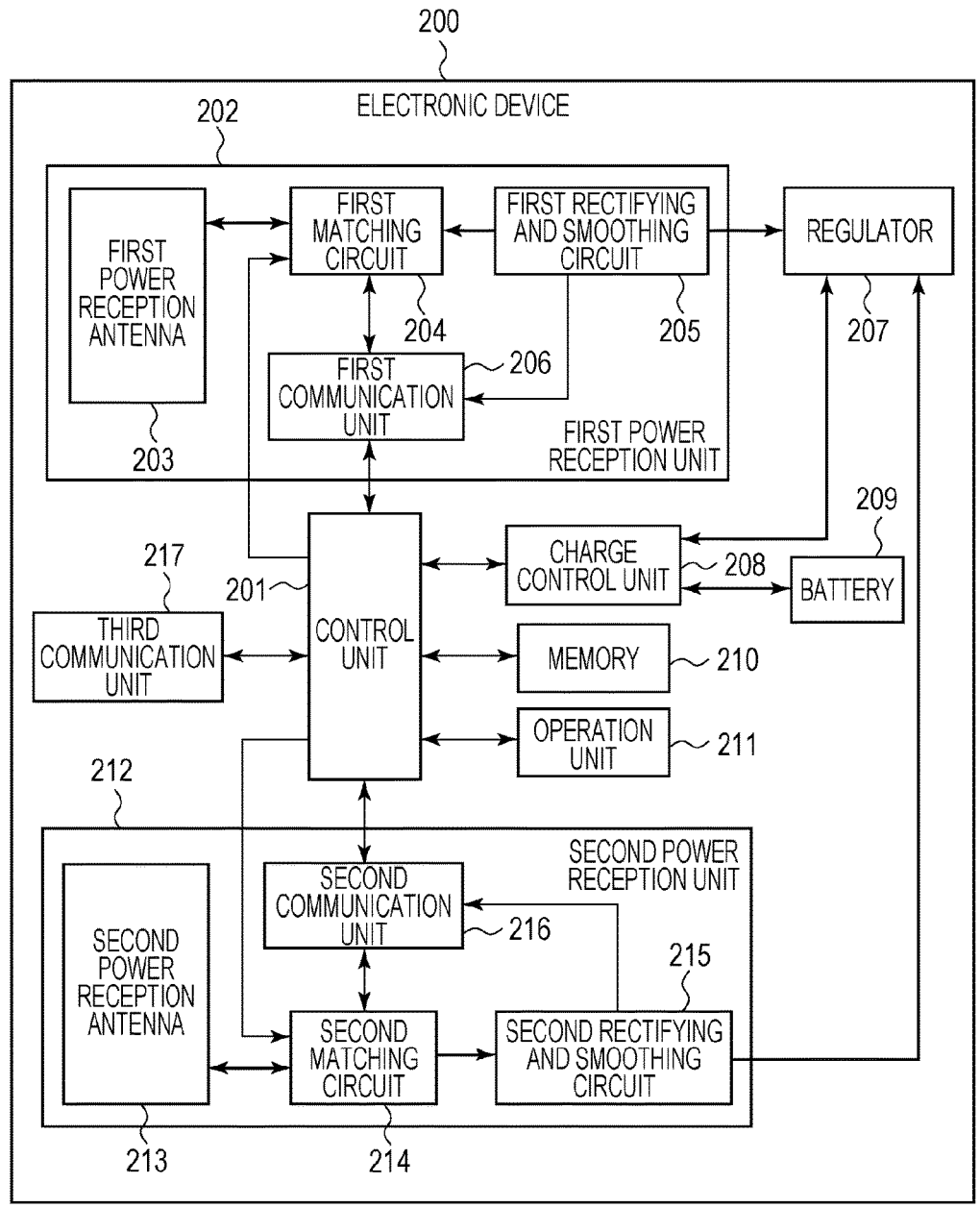

[Fig. 4]
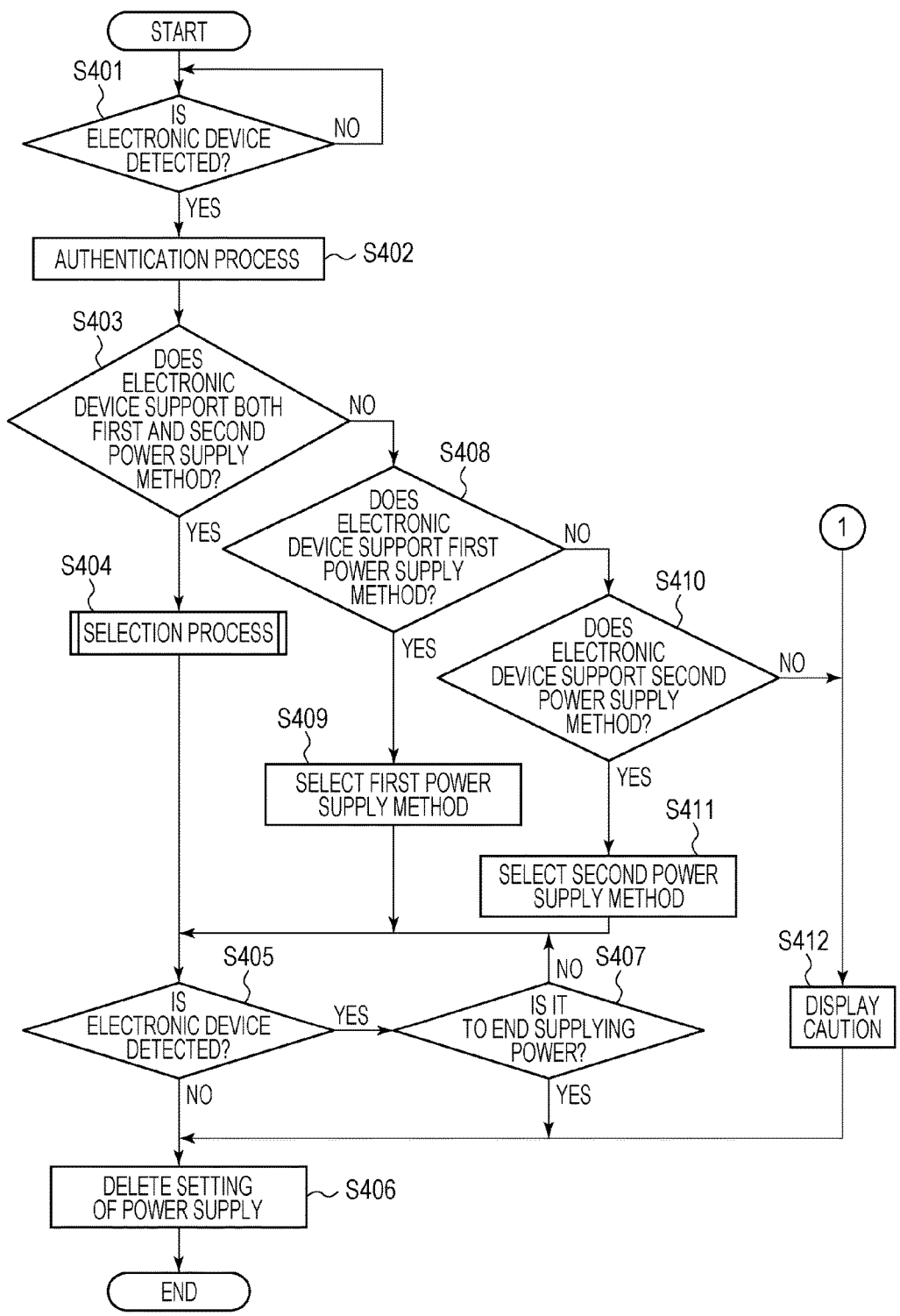

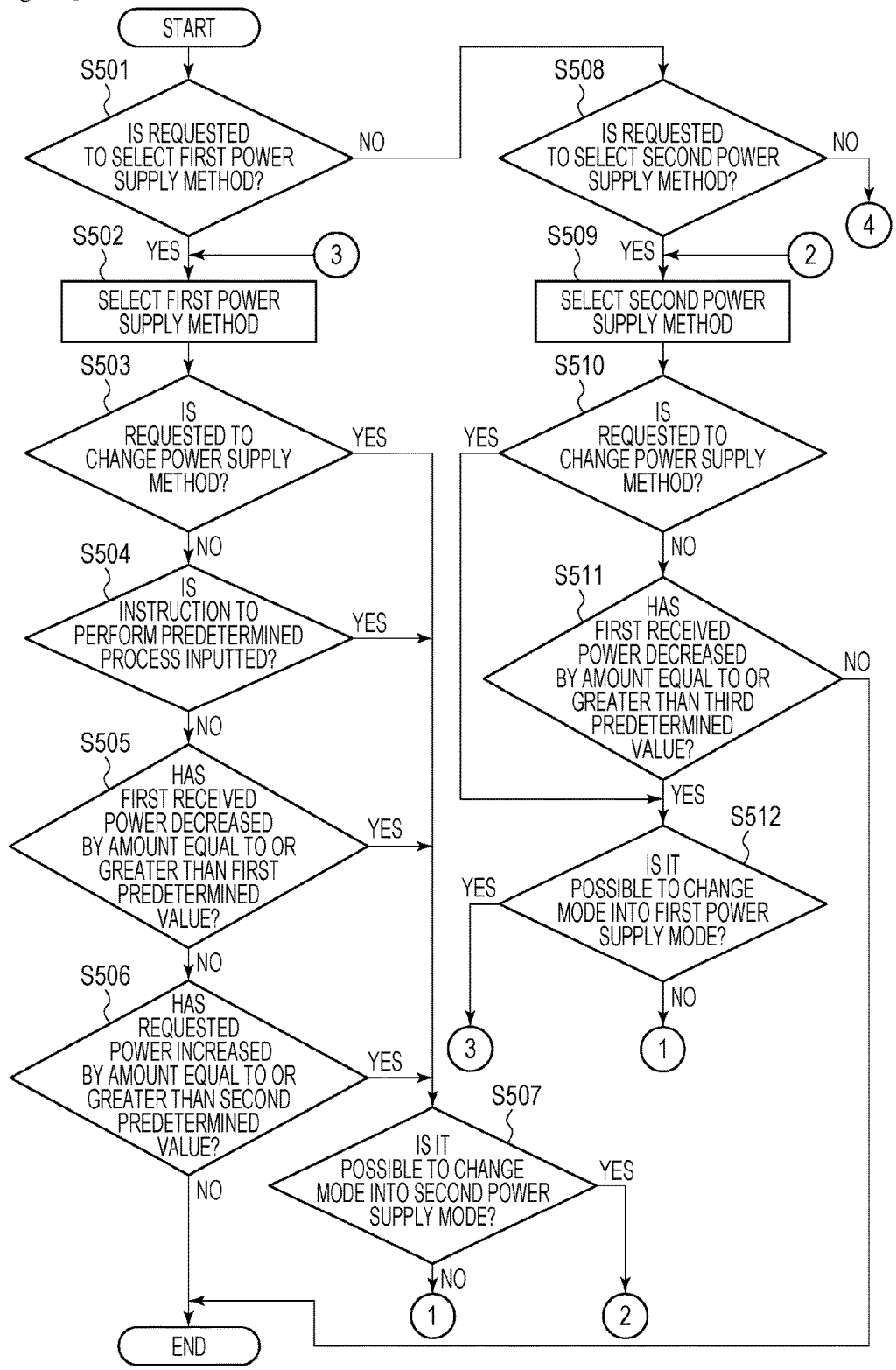

[Fig. 5B]
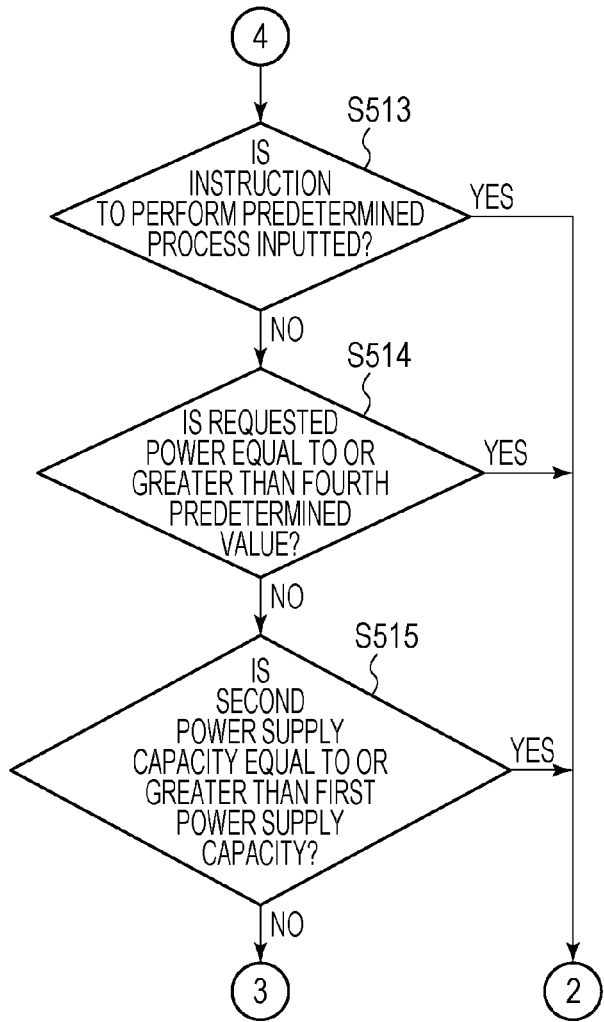

POWER SUPPLY APPARATUS, CONTROL METHOD, AND STORAGE MEDIUM

The current application claims the benefit of Japanese Patent Application No. 2012-284436 filed Dec. 27, 2012, which is incorporated by reference herein in its entirety.

TECHNICAL FIELD

The present invention relates to a power supply apparatus or the like configured to wirelessly supply power.

BACKGROUND ART

In recent years, it has been known to configure a power supply system such that a power supply apparatus wirelessly supplies power using a primary coil, and an electronic device receives, using a secondary coil, the power supplied from the power supply apparatus. In such a power supply system, power is supplied via electromagnetic induction from the power supply apparatus to the electronic device (for example, see PTL 1).

CITATION LIST

Patent Literature

PTL 1: Japanese Patent Laid-Open No. 2008-295273

SUMMARY OF INVENTION

Technical Problem

In known power supply systems, in a case where a power supply apparatus supports a plurality of power supply methods, there has been no consideration given as to how the power supply apparatus selects a power supply method, and thus the power supply apparatus is not capable of selecting a proper method of supplying power to an electronic device, that is, the power supply apparatus is not capable of properly controlling the supply of power to the electronic device.

In view of the above, the present invention provides a technique of selecting a proper method of supplying power to an electronic device and supply power to the electronic device based on the selected method.

Solution to Problem

In an aspect of the present invention, a power supply apparatus includes a first power supply unit configured to wirelessly supply power based on a first power supply method, a second power supply unit configured to wirelessly supply power based on a second power supply method different from the first power supply method, a communication unit configured to communicate with an electronic device, a selection unit configured to select one of the first power supply unit and the second power supply unit based on a communication with the device, and a control unit configured to perform a process to wirelessly supply power to the electronic device using the power supply unit selected by the selection unit, wherein the control unit controls the selection unit so as to select, based on a state of the electronic device, one of the first power supply unit and the second power supply unit.

In an aspect of the present invention, a control method includes wirelessly supplying power based on a first power supply method, wirelessly supplying power based on a second power supply method different from the first power supply method, communicating with an electronic device, selecting one of the first power supply method and the second power supply method based on a communication with the electronic device, performing a process to wirelessly supply power to the electronic device using the selected power supply method, and selecting again, based on a state of the electronic device, one of the first power supply method and the second power supply method depending on a state of the electronic device.

In an aspect of the present invention, a computer-readable storage medium stores a program configured to control a computer to execute a process including wirelessly supplying power based on a first power supply method, wirelessly supplying power based on a second power supply method different from the first power supply method, communicating with an electronic device, selecting one of the first power supply method and the second power supply method based on a communication with the electronic device, and performing a process to wirelessly supply power to the electronic device using the selected power supply method, and selecting again, based on a state of the electronic device, one of the first power supply method and the second power supply method.

Advantageous Effects of Invention

According to embodiments of the present invention, a proper method of supplying power to an electronic device is selected, and power is supplied to the electronic device based on the selected method.

BRIEF DESCRIPTION OF DRAWINGS

FIG. 1 is a diagram illustrating an example of a power supply system according to a first embodiment.

FIG. 2 is a block diagram illustrating an example of a power supply apparatus according to the first embodiment.

FIG. 3 is a block diagram illustrating an example of an electronic device according to the first embodiment.

FIG. 4 is a flow chart illustrating an example of a control process performed by a power supply apparatus according to the first embodiment.

FIG. 5A is a part of a flow chart illustrating an example of a selection process performed by a power supply apparatus according to the first embodiment.

FIG. 5B is another part of the flow chart illustrating the example of the selection process performed by the power supply apparatus according to the first embodiment.

DESCRIPTION OF EMBODIMENTS

The present invention is described in detail below with reference to embodiments in conjunction with accompanying drawings.

First Embodiment

A first embodiment of the present invention is described in detail below with reference to related drawings. In the first embodiment, as illustrated in FIG. 1, the power supply system includes a power supply apparatus 100 and an electronic device 200. In the power supply system according to the first embodiment, when the electronic device 200 is located within a predetermined range, the power supply apparatus 100 wirelessly supplies power to the electronic device 200. Thus, when the electronic device 200 is located within the predetermined range, the electronic device 200 is allowed to wirelessly receive power output from the power supply apparatus 100. However, when the electronic device 200 is not located within the predetermined range, the electronic device 200 is not capable of receiving power from the power supply apparatus 100. The predetermined range refers to a range in which the power supply apparatus 100 is capable of communicating with the electronic device 200. Note that the power supply apparatus 100 may be capable of wirelessly supplying power to a plurality of electronic devices.

The electronic device 200 may be a camera, an audio player, or a communication apparatus such as a portable telephone, a smartphone, or the like. The electronic device 200 may be a battery device including a battery. The electronic device 200 may be a vehicle, a display, or a personal computer. The electronic device 200 may be configured to be operable using power supplied from the power supply apparatus 100 even in a state in which no battery is mounted on the electronic device 200.

FIG. 2 is a block diagram illustrating an example of a configuration of the power supply apparatus 100 according to the first embodiment. As illustrated in FIG. 2, the power supply apparatus 100 includes a control unit 101, a conversion unit 102, a first power supply unit 103, a first oscillator 104, a first power generation unit 105, a first detection unit 106, a first matching circuit 107, a first communication unit 108, and a first power supply antenna 109. The power supply apparatus 100 further includes a second power supply unit 110, a second oscillator 111, a second power generation unit 112, a second detection unit 113, a second matching circuit 114, a second communication unit 115, and a second power supply antenna 116. The power supply apparatus 100 further includes a memory 117, a display unit 118, an operation unit 119, and a third communication unit 120.

The first power supply unit 103 includes the first oscillator 104, the first power generation unit 105, the first detection unit 106, the first matching circuit 107, the first communication unit 108, and the first power supply antenna 109. The first power supply unit 103 is used, for example, to supply power based on a first power supply method. The first power supply method is, for example, a power supply method using magnetic resonance. In the method using the magnetic resonance, in a state in which resonance occurs between the power supply apparatus 100 and the electronic device 200, power is transmitted from the power supply apparatus 100 to the electronic device 200. The state in which resonance occurs between the power supply apparatus 100 and the electronic device 200 refers to a state in which a resonant frequency of a power supply antenna used to output power from the power supply apparatus 100 is equal to a resonant frequency of a power reception antenna for receiving power in the electronic device 200.

The second power supply unit 110 includes the second oscillator 111, the second power generation unit 112, the second detection unit 113, the second matching circuit 114, the second communication unit 115, and the second power supply antenna 116. The second power supply unit 110 is used to supply power based on a second power supply method. The second power supply method is, for example, a power supply method according to the Qi standard established by Wireless Power Consortium (WPC). The second power supply unit 110 supplies power using electromagnetic induction. Note that it is assumed in the present embodiment that the power supply method used by the second power supply unit 110 is different from that used by the first power supply unit 103.

It is assumed in the first embodiment that the first power supply unit 103 supplies power over a greater range than a range covered by the second power supply unit 110, and the first communication unit 108 is capable of communicating over a greater range than the second communication unit 115 is capable. In the first embodiment, it is also assumed that the maximum supply power that the second power supply unit 110 is capable of outputting to the electronic device 200 is greater than the maximum supply power that the first power supply unit 103 is capable of outputting to the electronic device 200.

In the first embodiment, the power supply apparatus 100 has two power supply modes, that is, a first power supply mode and a second power supply mode, in which power is supplied to the electronic device 200. When the power supply apparatus 100 is in the first power supply mode, the power supply apparatus 100 performs a process of supplying power to the electronic device 200 using the first power supply unit 103 and a process of communicating using the first communication unit 108 to supply power. When the power supply apparatus 100 is in the second power supply mode, the power supply apparatus 100 performs a process of supplying power to the electronic device 200 using the second power supply unit 110 and a process of communicating using the second communication unit 115 to supply power.

When the power supply apparatus 100 is in the first power supply mode, the control unit 101 performs control such that supplying of power using the second power supply unit 110 is not performed. On the other hand, when the power supply apparatus 100 is in the second power supply mode, the control unit 101 performs control such that supplying of power using the first power supply unit 103 is not performed. Note that even when the power supply apparatus 100 is in the second power supply mode, the control unit 101 allows communication to be performed using the first communication unit 108.

The control unit 101 controls the power supply apparatus 100 by executing a computer program stored in the memory 117. The control unit 101 includes, for example, a central processing unit (CPU), a micro processing unit (MPU), or the like. In the present embodiment, it is assumed that the control unit 101 is realized by hardware.

When the power supply apparatus 100 is in a state in which it is connected to an AC power supply (not illustrated), the conversion unit 102 converts AC power supplied from the AC power supply (not illustrated) into DC power and supplies the resultant DC power to the power supply apparatus 100. The DC power from the conversion unit 102 is supplied at least one of the first power supply unit 103 and the second power supply unit 110.

The first oscillator 104 oscillates to generate a signal with a frequency for use in controlling the first power generation unit 105.

The first power generation unit 105 generates power to be output via the first power supply antenna 109 based on the power supplied from the conversion unit 102 and the oscillation frequency of the first oscillator 104. The power generated by the first power generation unit 105 includes first power and second power. The power generated by the first power generation unit 105 is supplied to the first power supply antenna 109 via the first detection unit 106 and the first matching circuit 107.

For example, the first power is used in performing a wireless communication between the power supply apparatus 100 and the electronic device 200 via the first power supply antenna 109 based on a predetermined communication method. The predetermined communication method is, for example, a communication method according to a Near Field Communication (NFC) standard established by the NFC forum. Alternatively, the predetermined communication method may be a communication method according to another standard such as an ISO/IEC 18092 standard, an ISO/IEC 14443 standard, an ISO/IEC 21481 standard, or the like. In the present example, it is assumed that the first power is equal to or lower than, for example, 1 W. Note that the maximum value of the first power is not limited to 1 W as long as first power is adapted to be used by the power supply apparatus 100 in performing a wireless communication based on the predetermined communication method. The first power may be adapted according to the NFC standard.

The second power is used to charge the electronic device 200 or to perform another particular operation. In a case where the second power is output via the first power supply antenna 109, the power supply apparatus 100 does not perform a wireless communication according to the NFC standard via the first power supply antenna 109. It is assumed by way of example that the second power is equal to or greater than 2 W. Note that the minimum value of the second power is not limited to 2 W as long as the second power is greater than the first power. The second power may be adapted according to the NFC standard.

The first detection unit 106 detects whether the electronic device 200 exists near the power supply apparatus 100 based on a voltage standing wave ratio (VSWR). The VSWR is a value indicating a ratio of a traveling wave of power output from the first power supply antenna 109 to a reflected wave of power output from the first power supply antenna 109. The first detection unit 106 detects whether the electronic device 200 exists near the power supply apparatus 100 based on a change in VSWR or the value of the VSWR.

The first matching circuit 107 is a resonant circuit configured to provide resonance between the first power supply antenna 109 and a power reception antenna of the electronic device 200. The first matching circuit 107 sets a resonance frequency of the first power supply antenna 109. The first matching circuit 107 includes a circuit that provides impedance matching between the first power generation unit 105 and the first power supply antenna 109. In a case where the power supply apparatus 100 outputs either one of the first power and the second power via the first power supply antenna 109, the control unit 101 controls the first matching circuit 107 such that the resonance frequency of the first power supply antenna 109 is set to be equal to a first frequency. The first frequency may be, for example, 13.56 MHz or 6.78 MHz. Alternatively, the first frequency may be a few ten MHz. Alternatively, the first frequency may be a frequency according to the NFC standard.

The first communication unit 108 performs a wireless communication based on the NFC standard. The first communication unit 108 transmits supply power control data, for use in controlling the supplying of power to the electronic device 200, to the electronic device 200 via the first power supply antenna 109. In a case where the first power is output via the first power supply antenna 109, the first communication unit 108 transmits the supply power control data to the electronic device 200 such that the supply power control data is superimposed on the first power. When the supply power control data from the power supply apparatus 100 is received, the electronic device 200 performs load modulation such that response data corresponding to the supply power control data is transmitted to the power supply apparatus 100. The load modulation performed by the electronic device 200 results in a change in a current flowing through the power supply antenna 109, and the first communication unit 108 detects the change in the current flowing through the power supply antenna 109 thereby receiving the response data corresponding to the supply power control data transmitted from the electronic device 200. In a case where the first communication unit 108 performs a wireless communication, the control unit 101 controls the first matching circuit 107 such that the resonance frequency of the first power supply antenna 109 is set to be equal to 13.56 MHz.

When the power supply apparatus 100 is in the first power supply mode, the control unit 101 controls the supplying of power to the electronic device 200 in accordance with the communication between the electronic device 200 and the first communication unit 108.

The first power supply antenna 109 is an antenna for outputting either one of the first power and the second power to the electronic device 200. The first power supply antenna 109 is also used by the first communication unit 108 to wirelessly communicate with the electronic device 200 according to the NFC standard.

The second oscillator 111 oscillates to generate a signal with a frequency for use in controlling the second power generation unit 112.

The second power generation unit 112 generates power to be output via the second power supply antenna 116 based on the power supplied from the conversion unit 102 and the oscillation frequency of the second oscillator 111. The power generated by the second power generation unit 112 includes third power. The third power generated by the second power generation unit 112 is supplied to the second power supply antenna 116 via the second detection unit 113 and the second matching circuit 114. The third power is used to charge the electronic device 200 or to perform another particular operation. It is assumed by way of example that the third power is equal to about 5 W. Note that the value of the third power is not limited to 5 W but the third power may be less than 5 W as long as the third power is greater than the first power. Note that the third power may be adapted according to the Qi standard.

The second detection unit 113 is used to detect whether the electronic device 200 exists near the power supply apparatus 100. More specifically, the second detection unit 113 detects whether the electronic device 200 exists near the power supply apparatus 100 by performing a detection process and a ping process.

The detection process includes detecting the resonance frequency of the second power supply antenna 116 and detecting whether the electronic device 200 exists near the power supply apparatus 100 based on a change in the resonance frequency of the second power supply antenna 116. Alternatively, the detection process may include detecting capacitance of a surface of an interface in which the second power supply antenna 116 is installed, and detecting whether the electronic device 200 exists near the power supply apparatus 100 based on a change in the detected capacitance. In a case where the existence of the electronic device 200 is detected via the detection process, the second detection unit 113 performs the ping process.

The ping process is a process of detecting and identifying the electronic device 200 using a digital ping. More specifically, the second detection unit 113 outputs a digital ping for identifying the electronic device 200 via the second power supply antenna 116. The digital ping is a power signal for detecting and identifying a power reception apparatus that is to receive power.

The second matching circuit 114 is a resonant circuit configured to provide resonance between the second power supply antenna 116 and the power reception antenna of the electronic device 200. The second matching circuit 114 sets the resonance frequency of the second power supply antenna 116. The second matching circuit 114 includes a circuit that provides impedance matching between the second power generation unit 112 and the second power supply antenna 116. In a case where the power supply apparatus 100 outputs the third power via the second power supply antenna 116, the control unit 101 controls the second matching circuit 114 such that the resonance frequency of the second power supply antenna 116 is set to be equal to a second frequency. The second frequency may be a frequency in a range from 100 KHz to 205 KHz. Alternatively, the second frequency may be a frequency according to the Qi standard. In the present embodiment, it is assumed by way of example that the second frequency is lower than the first frequency.

The second communication unit 115 wirelessly communicates with the electronic device 200 according to the Qi standard. More specifically, the second communication unit 115 receives data prescribed in the Qi standard via the second power supply antenna 116, and transmits the data prescribed in the Qi standard to the electronic device 200 via the second power supply antenna 116.

In a case where the power supply apparatus 100 is in the second power supply mode, the control unit 101 controls the supplying of power to the electronic device 200 in accordance with the communication between the electronic device 200 and the second communication unit 115.

The second power supply antenna 116 is an antenna for outputting the third power to the electronic device 200. The second power supply antenna 116 is used by the second communication unit 115 in wirelessly communicating with the electronic device 200 according to the Qi standard.

The memory 117 stores a computer program for controlling the power supply apparatus 100 and a parameter associated with the power supply apparatus 100. The memory 117 also stores data received from the electronic device 200.

The display unit 118 displays video data supplied from the memory 117.

The operation unit 119 provides a user interface for operating the power supply apparatus 100. The operation unit 119 includes a switch, a touch panel, and the like for operating the power supply apparatus 100. The control unit 101 control the power supply apparatus 100 according to an input signal given via the operation unit 119.

The third communication unit 120 wirelessly communicates with the electronic device 200 according to a wireless local area network (LAN) standard. The third communication unit 120 receives data including at least one of video data, audio data, and a command from the electronic device 200 according to the wireless LAN standard. The third communication unit 120 also transmits data including at least one of video data, audio data, and a command to the electronic device 200 according to the wireless LAN standard.

Next, referring to FIG. 3, a description is given below as to an example of a configuration of the electronic device 200 according to the first embodiment. The electronic device 200 includes a control unit 201, a first power reception unit 202, a first power reception antenna 203, a first matching circuit 204, a first rectifying and smoothing circuit 205, and a first communication unit 206. The electronic device 200 further includes a regulator 207, a charge control unit 208, a battery 209, a memory 210, and an operation unit 211. The electronic device 200 further includes a second power reception unit 212, a second power reception antenna 213, a second matching circuit 214, a second rectifying and smoothing circuit 215, a second communication unit 216, and a third communication unit 217.

The control unit 201 controls the electronic device 200 by executing the computer program stored in the memory 210. The control unit 201 includes, for example, a CPU, an MPU, or the like.

The first power reception unit 202 includes the first power reception antenna 203, the first matching circuit 204, the first rectifying and smoothing circuit 205, and the first communication unit 206. The first power reception unit 202 is used to receive power based on, for example, the method using the magnetic resonance. Note that it is assumed that the first power reception unit 202 corresponds to the first power supply unit 103, and the first power reception unit 202 is based on the first power supply method.

The first power reception antenna 203 is an antenna for receiving either one of the first power and the second power from the power supply apparatus 100. The first power reception antenna 203 is used to wirelessly communicate with the power supply apparatus 100 according to the NFC standard.

The first matching circuit 204 is a resonant circuit configured to provide resonance between the first power reception antenna 203 and the first power supply antenna 109 of the power supply apparatus 100. The first matching circuit 204 sets the resonance frequency of the first power reception antenna 203. In a case where the electronic device 200 receives power from the power supply apparatus 100 via the first power reception antenna 203, the control unit 201 controls the first matching circuit 204 such that the resonance frequency of the first power reception antenna 203 is set to be equal to a first frequency. The power received via the first power reception antenna 203 is supplied to the first rectifying and smoothing circuit 205 via the first matching circuit 204.

The first rectifying and smoothing circuit 205 removes data from the power supplied from the first matching circuit 204 and generates DC power. The first rectifying and smoothing circuit 205 supplies the generated DC power to the regulator 207. The data extracted from the power received via the first power reception antenna 203 is supplied from the first rectifying and smoothing circuit 205 to the first communication unit 206.

The first communication unit 206 wirelessly communicates with the power supply apparatus 100 according to the NFC standard. When data is received from the power supply apparatus 100 via the first power reception antenna 203, the first communication unit 206 performs a load modulation thereby transmitting response data corresponding to the data received from the power supply apparatus 100. The control unit 201 controls the operation of the electronic device 200 in accordance with the data received from the power supply apparatus 100 via the first communication unit 206.

The regulator 207 performs control such that power is supplied to the electronic device 200 from one of the first rectifying and smoothing circuit 205, the second rectifying and smoothing circuit 215, and the battery 209. More specifically, in accordance with a command from the control unit 201, the regulator 207 supplies power to the electronic device 200 from either one of the first rectifying and smoothing circuit 205 and the second rectifying and smoothing circuit 215, or, in accordance with the command from the control unit 201, the regulator 207 supplies a discharge power to the electronic device 200 from the battery 209 via the charge control unit 208.

The charge control unit 208 charges the battery 209 using power supplied from the regulator 207. In a case where power is supplied from the battery 209, the charge control unit 208 supplies the discharge power from the battery 209 to the regulator 207. The charge control unit 208 periodically detects information indicating the charge remaining in the battery 209 and information associated with charging of the battery 209, and the charge control unit 208 transmits the detected information to the control unit 201.

The battery 209 may be a battery removably disposed in the electronic device 200. The battery 209 may be a rechargeable secondary battery such as a lithium-ion battery or the like. The battery 209 is not limited to the lithium-ion battery but another type of battery may be employed as the battery 209.

The memory 210 stores a computer program for controlling the electronic device 200. The memory 210 also stores information associated with the electronic device 200, data received from the power supply apparatus 100, and the like.

The operation unit 211 provides a user interface for operating the electronic device 200. The operation unit 211 includes a switch, a touch panel, and the like for operating the electronic device 200. The control unit 201 controls the electronic device 200 according to an input signal given via the operation unit 211.

The second power reception unit 212 includes the second power reception antenna 213, the second matching circuit 214, the second rectifying and smoothing circuit 215, and the second communication unit 216.

The second power reception unit 212 is used to receive power according to, for example, the Qi standard established by WPC. The second power reception unit 212 may receive power using electromagnetic induction. In the present embodiment, it is assumed that the second power reception unit 212 corresponds to the second power supply unit 110, and the second power reception unit 212 is based on the second power supply method.

The second power reception antenna 213 is an antenna for receiving the third power from the power supply apparatus 100. The second power reception antenna 213 is also used to perform a wireless communication according to the Qi standard.

The second matching circuit 214 is a resonant circuit configured to provide resonance between the second power reception antenna 213 and the second power supply antenna 116 of the power supply apparatus 100. The second matching circuit 204 sets the resonance frequency of the second power reception antenna 213. In a case where the electronic device 200 receives power from the power supply apparatus 100 via the second power reception antenna 213, the control unit 201 controls the second matching circuit 214 such that the resonance frequency of the second power reception antenna 213 is set to be equal to the second frequency. The power received via the second power reception antenna 213 is supplied to the second rectifying and smoothing circuit 215 via the second matching circuit 214.

The second rectifying and smoothing circuit 215 generates DC power from the power supplied from the second matching circuit 214. The second rectifying and smoothing circuit 215 supplies the generated DC power to the regulator 207.

The second communication unit 216 wirelessly communicates with the power supply apparatus 100 according to the Qi standard. The second communication unit 216 receives data prescribed in the Qi standard via the second power reception antenna 213 and transmits data prescribed in the Qi standard to the power supply apparatus 100 via the second power reception antenna 213. The control unit 201 controls the operation of the electronic device 200 in accordance with the data received from the power supply apparatus 100 via the second communication unit 216.

The third communication unit 217 wirelessly communicates with the electronic device 200 according to the wireless LAN standard. The third communication unit 217 receives data including at least one of video data, audio data, and a command from the electronic device 200 according to the wireless LAN standard. The third communication unit 217 also transmits data including at least one of video data, audio data, and a command to the electronic device 200 according to the wireless LAN standard.

In the present embodiment, as described above, the power supply apparatus 100 is configured to wirelessly supply power to the electronic device 200. Note that the term "wirelessly supply power" is used to describe a wide variety of wirelessly supply methods including a non-contacted supply method, a no-contact supply method, and the like.

Control Process

Next, referring to a flow chart illustrated in FIG. 4, a description is given below as to a control process performed by the power supply apparatus 100 according to the first embodiment. The control process may be realized by the control unit 101 by executing the computer program stored in the memory 117. The control process illustrated in FIG. 4 is for setting the power supply mode of the power supply apparatus 100 and controlling the supplying of power to the electronic device 200 according to the power supply mode of the power supply apparatus 100.

In a case where the control process illustrated in FIG. 4 is performed by the power supply apparatus 100, the power supply apparatus 100 performs a communication using the first communication unit 108 to determine the power supply method supported by the electronic device 200.

For the above-described purpose, when the power of the power supply apparatus 100 is turned on, the control unit 101 controls the first matching circuit 107 such that the resonance frequency of the first power supply antenna 109 is set to be equal to 13.56 MHz thereby making it possible to perform the control process illustrated in FIG. 4. Furthermore, in this case, the control unit 101 controls the first power supply unit 103 such that the first power is output via the first power supply antenna 109. In this case, alternatively, the control unit 101 may further control the electronic device 200 such that the resonance frequency of the first power reception antenna 203 is set to be equal to 13.56 MHz. In this case, it is assumed that the third power is not output via the second power supply antenna 116.

In the case where the resonance frequency of the first power supply antenna is set to be equal to 13.56 MHz and the first power is output via the first power supply antenna 109, the control unit 101 performs a process in S401.

In S401, the control unit 101 detects whether the electronic device 200 exists within a predetermined range. More specifically, for example, the control unit 101 detects whether the electronic device 200 exists within the predetermined range from the power supply apparatus 100 based on the VSWR detected by the first detection unit 106.

In a case where a change in VSWR is equal to or greater than a predetermined value, the control unit 101 determines that the electronic device 200 exists within the predetermined range (Yes in S401). In this case (Yes in S401), the processing flow proceeds from S401 to S402. On the other hand, in a case where it is determined that a change in VSWR is smaller than the predetermined value, the control unit 101 determines that the electronic device 200 does not exist within the predetermined range (No in S401). In this case (No in S401), the processing flow returns from S401 to S401 (to repeat the process in S401).

In S402, the control unit 101 performs an authentication process for performing a wireless supply of power to the electronic device 200. For example, the authentication process includes a process that the control unit 101 controls the first communication unit 108 to transmit authentication data to the electronic device 200 via the first power supply antenna 109 and a process for performing, using response data returned in response to the authentication data, setting associated with the wireless supplying of power to the electronic device 200.

The authentication data is used by the power supply apparatus 100 to acquire information, associated with the wireless supply of power, from the electronic device 200. For example, the authentication data is used to acquire, from the electronic device 200, information indicating which power supply method is supported by the electronic device 200 and information indicating whether the electronic device 200 is a device that is a target for a wireless supply of power.

In a case where the electronic device 200 receives the authentication data from the power supply apparatus 100 via the first power reception antenna 203, the electronic device 200 transmits response data indicating the power supply method supported by the electronic device 200 to the power supply apparatus 100 via the first power reception antenna 203.

The control unit 101 determines, using the response data received in response to the authentication data, whether the electronic device 200 supports at least one of the first power supply method and the second power supply method. The control unit 101 stores, in the memory 117, the data acquired from the electronic device 200 and information indicating setting associated with the wireless supply of the power to the electronic device 200. After the authentication process is complete, the processing flow proceeds from S402 to S403.

In S403, the control unit 101 determines whether the electronic device 200 supports both the first power supply method and the second power supply method. In a case where it is determined that the electronic device 200 supports both the first power supply method and the second power supply method (Yes in S403), the processing flow proceeds from S403 to S404. In a case where it is determined that the electronic device 200 does not support the first power supply method and the second power supply method (No in S403), the processing flow proceeds from S403 to S408.

In S404, the control unit 101 performs a selection process. The selection process is a process of selecting a power supply mode of the power supply apparatus 100 in the case where the electronic device 200 supports both the first power supply method and the second power supply method. The selection process will be described in detail later. After the selection process is complete, the processing flow proceeds from S404 to S405.

In S405, the control unit 101 detects, as in S401, whether the electronic device 200 exits within the predetermined range. In a case where it is detected that the electronic device 200 exists within the predetermined range (Yes in S405), the processing flow proceeds from S405 to S407. In a case where it is detected that the electronic device 200 does not exist within the predetermined range (No in S405), the processing flow proceeds from S405 to S406.

In S406, the control unit 101 deletes from the memory 117 the data acquired from the electronic device 200 and the information indicating setting associated with the wireless supply of the power to the electronic device 200. Furthermore, the control unit 101 deletes from the memory 117 the information indicating the setting associated with the power supply mode of the power supply apparatus 100. In a case where power is output from at least one of the first power supply antenna 109 and the second power supply antenna 116, the control unit 101 controls the first power supply unit 103 and the second power supply unit 110 such that the output of the power is stopped. In this case, the processing flow is ended.

In S407, the control unit 101 determines whether the supplying of power is to be ended. For example, in a case where it is detected that the battery 209 of the electronic device 200 has been fully charged, the control unit 101 determines that the supplying of power is to be ended. On the other hand, in a case where it is not detected that the battery 209 of the electronic device 200 has been fully charged, the control unit 101 determines that the supplying of power is not to be ended. In the case where it is determined that the supplying of power is to be ended (Yes in S407), the processing flow proceeds from S407 to S406. In the case where it is determined that the supplying of power is not to be ended (No in S407), the processing flow returns from S407 to S405.

In S408, the control unit 101 determines whether the electronic device 200 supports the first power supply method. In a case where it is determined that the electronic device 200 supports the first power supply method (Yes in S408) the processing flow proceeds from S408 to S409. On the other hand, in a case where it is determined that the electronic device 200 does not support the first power supply method (No in S408), the processing flow proceeds from S408 to S410.

In S409, the control unit 101 selects the first power supply method and furthermore selects the first power supply mode as the power supply mode of the power supply apparatus 100. In this case, more specifically, the control unit 101 sets the power supply apparatus 100 into the first power supply mode and controls the first power supply unit 103 to wirelessly supply power according to the first power supply method. Furthermore, the control unit 101 stores in the memory 117 information indicating that the power supply apparatus 100 has been set into the first power supply mode. Furthermore, the control unit 101 may control the first communication unit 108 to transmit data to the electronic device 200 to notify that the first power supply method has been selected. In this case, the processing flow proceeds from S409 to S405.

In S410, the control unit 101 determines whether the electronic device 200 supports the second power supply method. In a case where it is determined that the electronic device 200 supports the second power supply method (Yes in S410), the processing flow proceeds from S410 to S411. On the other hand, in a case where it is determined that the electronic device 200 does not support the second power supply method (No in S410), the processing flow proceeds from S410 to S412.

In S411, the control unit 101 selects the second power supply method and further selects the second power supply mode as the power supply mode of the power supply apparatus 100. In this case, more specifically, the control unit 101 sets the power supply apparatus 100 into the second power supply mode and controls the second power supply unit 110 to wirelessly supply power according to the second power supply method. Furthermore, the control unit 101 stores in the memory 117 information indicating the power supply apparatus 100 has been set into the second power supply mode. Furthermore, the control unit 101 may control the first communication unit 108 to transmit data to the electronic device 200 to notify that the second power supply method has been selected. In a case where the electronic device 200 does not support the NFC standard, the control unit 101 may control the second communication unit 115 to transmit data to the electronic device 200 to notify that the second power supply method has been selected. In this case, the processing flow proceeds from S411 to S405.

In S412, the control unit 101 controls the display unit 118 to display predetermined caution data. The predetermined caution data may include, for example, data indicating that it is not allowed to wirelessly supply power to the electronic device 200, data indicating that the electronic device 200 is not supported by the power supply apparatus 100, and the like. In this case, the processing flow proceeds from S412 to S406.

In the case where the control process illustrated in FIG. 4 is performed by the power supply apparatus 100, in the example illustrated above, it is assumed by way of example that the control unit 101 controls the first matching circuit 107 such that the resonance frequency of the first power supply antenna is set to be equal to 13.56 MHz. Alternatively, in the case where the control process illustrated in FIG. 4 is performed by the power supply apparatus 100, the control unit 101 may control the first matching circuit 107 such that the resonance frequency of the first power supply antenna is set to be equal to a frequency according to the NFC standard.

Selection Process

Next, the selection process performed by the power supply apparatus 100 in S404 in FIG. 4 according to the first embodiment is described below with reference to a flow chart illustrated in FIGS. 5A and 5B. The selection process is realized by the control unit 101 by executing the computer program stored in the memory 117. The selection process illustrated in FIGS. 5A and 5B is a process of selecting a power supply method of supplying power to the electronic device 200 and selecting a power supply mode of the power supply apparatus 100 in the case where the electronic device 200 supports both the first power supply method and the second power supply method.

In S501, the control unit 101 determines whether it has been requested from the electronic device 200 to select the first power supply method. More specifically, the control unit 101 determines whether either one of the first communication unit 108 and the second communication unit 115 has received from the electronic device 200 first request data for requesting to select the first power supply method. In a case where it is determined that either one of the first communication unit 108 and the second communication unit 115 has received the first request data, the control unit 101 determines that it has been requested from the electronic device 200 to select the first power supply method (Yes in S501). In this case (Yes in S501), the processing flow proceeds from S501 to S502. On the other hand, in a case where it is determined that neither the first communication unit 108 nor the second communication unit 115 has received the first request data, the control unit 101 determines that it has not been requested from the electronic device 200 to select the first power supply method (No in S501). In this case (No in S501), the processing flow proceeds from S501 to S508.

In S502, the control unit 101 selects the first power supply method and furthermore selects the first power supply mode as the power supply mode of the power supply apparatus 100. In this case, the control unit 101 sets the power supply apparatus 100 into the first power supply mode and controls the first power supply unit 103 to wirelessly supply power according to the first power supply method. Furthermore, the control unit 101 stores in the memory 117 information indicating that the power supply apparatus 100 has been set into the first power supply mode. Furthermore, the control unit 101 may control one of the first communication unit 108 and the second communication unit 115 to transmit data to the electronic device 200 to notify that the first power supply method has been selected. In this case, the processing flow proceeds from S502 to S503.

In S503, the control unit 101 determines whether it has been requested from the electronic device 200 to change the power supply method. More specifically, the control unit 101 determines whether either one of the first communication unit 108 and the second communication unit 115 has received from the electronic device 200 second request data for requesting to change the power supply method. In a case where it is determined that either one of the first communication unit 108 and the second communication unit 115 has received the second request data, the control unit 101 determines that it has been requested from the electronic device 200 to change the power supply method (Yes in S503). In this case (Yes in S503), the processing flow proceeds from S503 to S507. On the other hand, in a case where it is determined that neither the first communication unit 108 nor the second communication unit 115 has received the second request data, the control unit 101 determines that it has not been requested from the electronic device 200 to change the power supply method (No in S503). In this case (No in S503), the processing flow proceeds from S503 to S504.

When the power supply apparatus 100 is in the first power supply mode, there is a possibility that a user operates the operation unit 119 to cause the first communication unit 108 to perform the predetermined process. The predetermined process is a process different from the communication process for wirelessly supplying power to the electronic device 200. The predetermined process may include, for example, a process of acquiring, via the first communication unit 108, data used by the third communication unit 120 to perform a wireless communication. The predetermined process may include, for example, a process of transmitting data used by the third communication unit 120 to perform a wireless communication. The predetermined process may include, for example, a process of providing a particular service such as electronic payment or the like. The predetermined process may include, for example, a process of reading data different from data for controlling the wireless power supply.

In a case where an instruction for causing the first communication unit 108 to perform the predetermined process is input to the control unit 101, the first communication unit 108 goes into a state in which it is not allowed to perform a communication to control wireless supplying of power by the first power supply unit 103. Therefore, in the case where the control unit 101 receives the instruction for causing the first communication unit 108 to perform the predetermined process, the control unit 101 controls the first power supply unit 103 to stop the wireless supplying of power.

In the case where the power supply apparatus 100 is in the first power supply mode, the control unit 101 controls the first power supply unit 103 not to perform the wireless supplying of power to the electronic device 200 during a period in which the predetermined process is performed by the first communication unit 108. As a result, during the period in which the predetermined process is performed by the first communication unit 108, the electronic device 200 is not allowed either to charge the battery 209 by using power supplied from the power supply apparatus 100 or to perform an operation other than the charging by using power supplied from the power supply apparatus 100.

To avoid such a situation, when the power supply apparatus 100 is in the first power supply mode, the control unit 101 performs a process of changing the power supply mode of the power supply apparatus 100 into the second power supply mode depending on whether the instruction for causing the first communication unit 108 to perform the predetermined process is inputted.

Thus in S504, the control unit 101 determines whether the instruction for causing the first communication unit 108 to perform the predetermined process has been input. The instruction for causing the first communication unit 108 to perform the predetermined process may be input to the control unit 101 via the operation unit 119 or via an external apparatus.

In a case where the instruction for causing the first communication unit 108 to perform the predetermined process has been input to the control unit 101 (Yes in S504), the processing flow proceeds from S504 to S507. In a case where the instruction for causing the first communication unit 108 to perform the predetermined process has not been input to the control unit 101 (No in S504), the processing flow proceeds from S504 to S505.

In the case where the power supply apparatus 100 is in the first power supply mode and the electronic device 200 exists within the predetermined range, there is a possibility that a power, which is received by the electronic device 200 from the power supply apparatus 100, is decreased depending on a direction of the electronic device 200 or a location of the electronic device 200. In the case where the power supply apparatus 100 is in the first power supply mode and the electronic device 200 and an external apparatus exist within the predetermined range, there is a possibility that a power, which is received by the electronic device 200 from the power supply apparatus 100, is decreased depending on an influence by the external apparatus. In such cases, even when the first power supply unit 103 outputs maximum supply power to the electronic device 200, there is a possibility that the electronic device 200 cannot receive as much power from the power supply apparatus 100 as necessary to perform charging or other operations.

To avoid such a situation, when the power supply apparatus 100 is in the first power supply mode, the control unit 101 performs a process to change the power supply mode of the power supply apparatus 100 from the first power supply mode into the second power supply mode depending on the power that the electronic device 200 receives from the first power supply unit 103. Hereinafter, the power received by the electronic device 200 from the first power supply unit 103 will be referred to as first received power.

Thus, in S505, the control unit 101 determines whether the first received power has decreased by an amount equal to or greater than a first predetermined value. More specifically, in S505, the control unit 101 controls one of the first communication unit 108 and the second communication unit 115 to acquire information indicating the first received power from the electronic device 200. Alternatively, in S505, the control unit 101 may detect information indicating the first received power by detecting the characteristic of resonance between the first power supply antenna 109 and the first power reception antenna 203, and may perform the process in S505 according to the detected information. Alternatively, in S505, the control unit 101 may detect VSWR to detect information indicating the first received power. Note that the first predetermined value is stored in advance in the memory 117. The first predetermined value may be a value allowed to be set by a user. The first predetermined value may be set in accordance with power used by the first communication unit 206 to wirelessly communicate with the first communication unit 108.

In a case where it is determined that the first received power has decreased by an amount equal to or greater than the first predetermined value (Yes in S505), the processing flow proceeds from S505 to S507. In a case where it is determined that the first received power has not decreased by an amount equal to or greater than the first predetermined value (No in S505), the processing flow proceeds from S505 to S506.

When the power supply apparatus 100 is in the first power supply mode, there is a possibility that the operation of the electronic device 200 is changed in response to an operation of the operation unit 211 by a user. In this case, because a change in power consumption of the electronic device 200 may occur, a power, that the electronic device 200 requests to the power supply apparatus 100, may be changed. In a case where the power, that the electronic device 200 requests to the power supply apparatus 100, has been increased, there is a possibility that the power supply apparatus 100 is not capable of supplying to the electronic device 200 power used in charging or in other operations even when the first power supply unit 103 outputs a maximum possible amount of power to the electronic device 200.

To prevent such a situation, when the power supply apparatus 100 is in the first power supply mode, the control unit 101 performs a process to change the power supply mode of the power supply apparatus 100 from the first power supply mode into the second power supply mode depending on the power that the electronic device 200 requests to the power supply apparatus 100. Hereinafter, the power, that electronic device 200 requests to the power supply apparatus 100, will be referred to as requested power.

In S506, the control unit 101 determines whether the requested power has increased by an amount equal to or greater than the second predetermined value. More specifically, in S506, the control unit 101 controls one of the first communication unit 108 and the second communication unit 115 to acquire information indicating the requested power from the electronic device 200. Note that the second predetermined value is stored in advance in the memory 117. The second predetermined value may be a value allowed to be set by a user. The second predetermined value may be set depending on the maximum supply power that the first power supply unit 103 is capable of outputting to the electronic device 200.

In a case where it is determined that the requested power has increased by an amount equal to or greater than the second predetermined value (Yes in S506), the processing flow proceeds from S506 to S507. In a case where it is determined that the requested power has not increased by an amount equal to or greater than the second predetermined value (No in S506), the selection process is ended, and the processing flow proceeds to S405 in the control process illustrated in FIG. 4.

In S507, the control unit 101 determines whether it is allowed to change the power supply mode of the power supply apparatus 100 from the first power supply mode into the second power supply mode. In a case where it is allowed to change the power supply mode of the power supply apparatus 100 from the first power supply mode into the second power supply mode (Yes in S507), the processing flow proceeds from S507 to S509. In a case where it is not allowed to change the power supply mode of the power supply apparatus 100 from the first power supply mode into the second power supply mode (No in S507), the selection process is ended, and the processing flow proceeds to S412 in the control process illustrated in FIG. 4.

In S508, the control unit 101 determines whether it has been requested from the electronic device 200 to select the second power supply method.

More specifically, the control unit 101 determines whether either one of the first communication unit 108 and the second communication unit 115 has received from the electronic device 200 third request data for requesting to select the second power supply method. In a case where it is determined that either one of the first communication unit 108 and the second communication unit 115 has received the third request data, the control unit 101 determines that it has been requested from the electronic device 200 to select the second power supply method (Yes in S508). In this case (Yes in S508), the processing flow proceeds from S508 to S509. On the other hand, in a case where it is determined that neither the first communication unit 108 nor the second communication unit 115 has received the third request data, the control unit 101 determines that it has not been requested from the electronic device 200 to select the second power supply method (No in S508). In this case (No in S508), the processing flow proceeds from S508 to S513.

In S509, the control unit 101 selects the second power supply method and further selects the second power supply mode as the power supply mode of the power supply apparatus 100. In this case, more specifically, the control unit 101 sets the power supply apparatus 100 into the second power supply mode and controls the second power supply unit 110 to wirelessly supply power according to the second power supply method. Furthermore, the control unit 101 stores in the memory 117 information indicating the power supply apparatus 100 has been set into the second power supply mode. Furthermore, the control unit 101 may control one of the first communication unit 108 and the second communication unit 115 to transmit data to the electronic device 200 to notify that the second power supply method has been selected. In this case, the processing flow proceeds from S509 to S510.

In S510, the control unit 101 determines, as in S503, whether In S503, the control unit 101 determines whether it has been requested from the electronic device 200 to change the power supply method. In a case where it is determined that either one of the first communication unit 108 and the second communication unit 115 has received the second request data, the control unit 101 determines that it has been requested from the electronic device 200 to change the power supply method (Yes in 510). In this case (Yes in S510), the processing flow proceeds from S510 to S512. On the other hand, in a case where it is determined that neither the first communication unit 108 nor the second communication unit 115 has received the second request data, the control unit 101 determines that it has not been requested from the electronic device 200 to change the power supply method (No in S510). In this case (No in S510), the processing flow proceeds from S510 to S511.

In a case where the power supply apparatus 100 is in the second power supply mode and the electronic device 200 exists within the predetermined range, there is a possibility that a power, which received by the electronic device 200 from the power supply apparatus 100, is decreased depending on a direction of the electronic device 200 or a location of the electronic device 200. In the case where the power supply apparatus 100 is in the second power supply mode and the electronic device 200 and an external apparatus exist within the predetermined range, there is a possibility that a power, which is received by the electronic device 200 from the power supply apparatus 100, is decreased depending on an influence by the external apparatus. In such cases, even when the second power supply unit 110 outputs maximum supply power to the electronic device 200, there is a possibility that the electronic device 200 cannot receive as much power from the power supply apparatus 100 as necessary to perform charging or other operations.

To avoid such a situation, in a case where the power supply apparatus 100 is in the second power supply mode, the control unit 101 performs a process to change the power supply mode of the power supply apparatus 100 from the second power supply mode into the first power supply mode depending on the power the electronic device 200 receives from the second power supply unit 110. Hereinafter, the power received by the electronic device 200 from the second power supply unit 110 will be referred to as second received power.

In S511, the control unit 101 determines whether the second received power has decreased by an amount equal to or greater than a third predetermined value. More specifically, in S511, the control unit 101 controls one of the first communication unit 108 and the second communication unit 115 to acquire information indicating the second received power from the electronic device 200. Alternatively, in S511, the control unit 101 may detect information indicating the second received power by detecting the characteristic of resonance between the second power supply antenna 116 and the second power reception antenna 213, and may perform the process in S511 according to the detected information. Note that the third predetermined value is stored in advance in the memory 117. The third predetermined value may be a value allowed to be set by a user. The third predetermined value may be set in accordance with power used by the second communication unit 216 to wirelessly communicate with the second communication unit 115. The third predetermined value may be a value different from the first predetermined value.

The third predetermined value may be a value smaller than the first predetermined value. Since a range within which power is allowed to be supplied by the second power supply unit 110 is smaller than a range covered by the first power supply unit 103, there is a possibility that the second received power may be decreased if a distance between the powers supply apparatus 100 and the electronic device 200 is changed. Therefore, even when a change in second received power is smaller than a change in first received power, the power supply apparatus 100 selects again the power supply mode of the power supply apparatus 100 according to the state of the electronic device 200.

In a case where it is determined that the second received power has decreased by an amount equal to or greater than the third predetermined value (Yes in S511), the processing flow proceeds from S511 to S512. In a case where it is determined that the second received power has not decreased by the amount equal to or greater than the third predetermined value (No in S511), the selection process is ended and the processing flow proceeds to S405 in the control process illustrated in FIG. 4.

In S512, the control unit 101 determines whether it is allowed to change the power supply mode of the power supply apparatus 100 from the second power supply mode into the first power supply mode. In a case where it is allowed to change the power supply mode of the power supply apparatus 100 from the second power supply mode into the first power supply mode (Yes in S512), the processing flow proceeds from S512 to S502. In a case where it is not allowed to change the power supply mode of the power supply apparatus 100 from the second power supply mode into the first power supply mode (No in S512), the present process is ended, and the processing flow proceeds to S412 in the control process illustrated in FIG. 4.

In S513, the control unit 101 determines, as in S504, the control unit 101 determines whether the instruction for causing the first communication unit 108 to perform the predetermined process has been input.

In a case where the instruction for causing the first communication unit 108 to perform the predetermined process has been input to the control unit 101 (Yes in S513), the processing flow proceeds from S513 to S509. In a case where the instruction for causing the first communication unit 108 to perform the predetermined process has not been input to the control unit 101 (No in S513), the processing flow proceeds from S513 to S514.

In S514, the control unit 101 determines whether the requested power is equal to or greater than the fourth predetermined value. More specifically, in S514, the control unit 101 controls one of the first communication unit 108 and the second communication unit 115 to acquire information indicating the requested power from the electronic device 200. Note that the fourth predetermined value is stored in advance in the memory 117. The fourth predetermined value may be a value allowed to be set by a user. The fourth predetermined value may be set depending on the maximum supply power that the first power supply unit 103 is capable of outputting to the electronic device 200.

In a case where it is determined that the requested power is equal to or greater than the fourth predetermined value (Yes in S514), the processing flow proceeds from S514 to S509. In a case where it is not determined that the requested power is equal to or greater than the fourth predetermined value (No in S514), the processing flow proceeds from S514 to S515.

In S515, the control unit 101 determines whether the second power supply capacity is equal to or greater than the first power supply capacity. More specifically, the control unit 101 makes a comparison between the first power supply capacity and the second power supply capacity, and determines which one of the first and second power supply methods is more proper based on a comparison result.

For example, the first power supply capacity is equal to the first received power, and the second power supply capacity is equal to the second received power. More specifically, in S515, the control unit 101 controls one of the first communication unit 108 and the second communication unit 115 to acquire information indicating the first received power and information indicating the second received power from the electronic device 200. Furthermore, the control unit 101 determines whether the second received power is equal to or greater than the first received power. In a case where the second received power is equal to or greater than the first received power (Yes in S515), the processing flow proceeds from S515 to S509. In a case where the second received power is smaller than the first received power (No in S515), the processing flow proceeds from S515 to S502.

For example, the first power supply capacity is a maximum supply power available from the first power supply unit 103, and the second power supply capacity is a maximum supply power available from the second power supply unit 110. Hereinafter, the maximum supply power available from the first power supply unit 103 is referred to as first maximum supply power, and the maximum supply power available from the second power supply unit 110 is referred to as second maximum supply power. Note that it is assumed by way of example that information indicating the first maximum supply power and information indicating the second maximum supply power are stored in advance in the memory 117. In this case, in S515, the control unit 101 reads out the information indicating the first maximum supply power and the information indicating the second maximum supply power from the memory 117. Furthermore, the control unit 101 determines whether the second maximum supply power is equal to or greater than the first maximum supply power. In a case where the second maximum supply power is equal to or greater than the first maximum supply power (Yes in S515), the processing flow proceeds from S515 to S509. In a case where the second maximum supply power is smaller than the first maximum supply power (No in S515), the processing flow proceeds from S515 to S502.

In the embodiment described above, it is assumed by way of example that the third communication unit 120 and the third communication unit 217 perform a wireless communication according to the wireless LAN standard. However, the standard of the wireless communication is not limited to the wireless LAN standard. For example, the third communication unit 120 and the third communication unit 217 may perform a wireless communication according to the Blue Tooth (registered trademark) standard instead of the wireless LAN standard. In this case, the predetermined process includes a process for acquiring data to be used by the third communication unit 120 to perform a wireless communication according to the Blue Tooth standard.

Alternatively, the third communication unit 120 and the third communication unit 217 may perform a wireless communication according to a WHDI standard or a Wireless HD standard instead of the wireless LAN standard. In this case the predetermined process includes a process for acquiring data to be used by the third communication unit 120 to perform a wireless communication according to the WHDI standard or the Wireless HD standard.

In the selection process illustrated in FIGS. 5A and 5B, in a case where a communication with the electronic device 200 is performed using the first communication unit 108, the control unit 101 controls the first matching circuit 107 such that the resonance frequency of the first power supply antenna 109 is set to 13.56 MHz. Furthermore, in the case where the communication with the electronic device 200 is performed using the first communication unit 108, the control unit 101 controls the first power supply unit 103 such that first power is output via the first power supply antenna 109.

Furthermore, in the selection process illustrated in FIGS. 5A and 5B, in a case where a communication with the electronic device 200 is performed using the second communication unit 115, the control unit 101 controls the second matching circuit 114 such that the resonance frequency of the second power supply antenna 116 is set to be equal to one of frequencies from 100 KHz to 205 KHz.

In the power supply apparatus 100 according to the first embodiment, as described above, in the case where the power supply apparatus 100 supports both the first power supply method and the second power supply method, a determination is performed based on the authentication of the electronic device 200 as to which power supply method is supported by the electronic device 200.

In a case where the first power supply method is supported but the second power supply method is not supported by the electronic device 200, the power supply apparatus 100 selects the first power supply method and sets the power supply apparatus 100 into the first power supply mode. In a case where the power supply apparatus 100 can perform a wireless supply of power to the electronic device 200 properly depending on the power supply method supported by the electronic device 200.

In a case where the second power supply method is supported but the first power supply method is not supported by the electronic device 200, the power supply apparatus 100 selects the second power supply method and sets the power supply apparatus 100 into the second power supply mode. In a case where the power supply apparatus 100 can performs a wireless supply of power to the electronic device 200 properly depending on the power supply method supported by the electronic device 200.

In the case where both the first power supply method and the second power supply method are supported by the electronic device 200, the power supply apparatus 100 selects, depending on a state of the electronic device 200, and power supply method and sets a power supply mode of the power supply apparatus 100.

In this case, in response to a request for a power supply method from the electronic device 200, the power supply apparatus 100 may select the power supply method and may select a power supply mode of the power supply apparatus 100. Therefore the power supply apparatus 100 can performs a wireless supply of power supply to the electronic device 200 properly depending on the power supply method requested by the electronic device 200.

In this case, the power supply apparatus 100 may select, depending on power requested by the electronic device 200, a power supply method and may select a power supply mode of the power supply apparatus 100. Therefore the power supply apparatus 100 can performs a wireless supply of power to the electronic device 200 properly depending on an energy requested by the electronic device 200.

In this case, the power supply apparatus 100 may select, depending on power that the first power supply unit 103 can output to the electronic device 200 and power that the second power supply unit 110 can output to the electronic device 200, a power supply method and selects a power supply mode of the power supply apparatus 100. Therefore the power supply apparatus 100 can perform a wireless supply of power to the electronic device 200 properly depending on the power supply capacity of the first power supply unit 103 and the power supply capacity of the second power supply unit 110.

In this case, the power supply apparatus 100 may select, depending on received power that the electronic device 200 receives from the first power supply unit 103 and received power that the electronic device 200 receives from second power supply unit 110, a power supply method and selects a power supply mode of the power supply apparatus 100. And, because the power supply apparatus can supply power enough to the electronic device 200 even when a direction or a location of the electronic device 200 causes a reduction in power the electronic device 200 receives from the power supply apparatus 100, the power supply apparatus 100 can properly perform a wireless supply of power to the electronic device 200. Furthermore, the power supply apparatus 100 can supply power enough to the electronic device 200 even when an influence of an external apparatus causes a reduction in power the electronic device 200 receives from the power supply apparatus 100, the power supply apparatus 100 can properly perform a wireless supply of power to the electronic device 200.

Note that the control unit 101 performs the process in S402 in the control process illustrated in FIG. 4 by using the first communication unit 108 without using the second communication unit 115.

That is, the second communication unit 115 is not suitable for communication over a long distance compared with the first communication unit 108, and the second power supply unit 110 is not suitable for power supply over a long distance compared with the first power supply unit 103. In a case where the distance between the power supply apparatus 100 and the electronic device 200 is not very small, when the power supply apparatus 100 tries to perform an authentication process using the second communication unit 115, there is a possibility that the authentication between the power supply apparatus 100 and the electronic device 200 fails. In this case, the power supply apparatus 100 does not start supplying power to the electronic device 200, and thus the electronic device 200 is not capable of receiving power from the power supply apparatus 100.

When the power supply apparatus 100 performs the authentication process using the second power supply unit 110, the electronic device 200 is supposed to transmit data for use in authentication to the power supply apparatus 100. However, in a case where the battery 209 does not have remaining capacity sufficient to perform a communication with the power supply apparatus 100, there is a possibility that the electronic device 200 cannot perform authentication between the power supply apparatus 100 and the electronic device 200. In this case the power supply apparatus 100 does not start supplying power to the electronic device 200, and thus the electronic device 200 is not capable of receiving power from the power supply apparatus 100.

In view of the above, the power supply apparatus 100 performs the process in S402 in the control process illustrated in FIG. 4 by using the first communication unit 108 such that the authentication between the power supply apparatus 100 and the electronic device 200 is successfully performed regardless of the distance between the power supply apparatus 100 and the electronic device 200. Furthermore, in the case where the power supply apparatus 100 performs the process in S402 in the control process illustrated in FIG. 4 by using the first communication unit 108, it is possible to perform the authentication between the power supply apparatus 100 and the electronic device 200 regardless of the remaining capacity of the battery 209. However, in a case where the first communication unit 108 fails, in S402, to acquire information indicating the power supply method supported by the electronic device 200 from the electronic device 200, the second communication unit 115 may be used to acquire from the electronic device 200 information indicating the power supply method supported by the electronic device 200. In this case, the control unit 101 may perform S403, S408, and S410 using the information indicating the power supply method supported by the electronic device 200 acquired from the electronic device 200 by using the second communication unit 115.

In the first embodiment described above, it is assumed by way of example that the maximum supply power that the second power supply unit 110 is capable of outputting to the electronic device 200 is greater than the maximum supply power that the first power supply unit 103 is capable of outputting to the electronic device 200. However, in the first embodiment, alternatively, the maximum supply power that the first power supply unit 103 is capable of outputting to the electronic device 200 may be equal to or greater than the maximum supply power that the second power supply unit 110 is capable of outputting to the electronic device 200.

In this case where the maximum supply power that the first power supply unit 103 is capable of outputting to the electronic device 200 is equal to or greater than the maximum supply power that the second power supply unit 110 is capable of outputting to the electronic device 200, the process in S506 may not be performed. That is, in the case where it is determined that the first received power has not decreased by an amount equal to or greater than the first predetermined value (No in S505), the processing flow illustrated in FIGS. 5A and 5B is ended, and the processing flow proceeds to S405 in the control process illustrated in FIG. 4. In this case, after it is determined that the second received power has not decreased by an amount equal to or greater than the third predetermined value (No in S511), the control unit 101 performs a process of determining whether the requested power has increased by an amount equal to or greater than the second predetermined value. In this case the second predetermined value may be set depending on the maximum supply power that the second power supply unit 110 is capable of outputting to the electronic device 200. In a case where it is determined that the requested power has increased by an amount equal to or greater than the second predetermined value the processing flow proceeds to S512. In a case where it is determined that the requested power has not increased by an amount equal to or greater than the second predetermined value, the selection process is ended and the processing flow proceeds to S405 in the control process illustrated in FIG. 4.

In the case where the maximum supply power that the first power supply unit 103 is capable of outputting to the electronic device 200 is equal to or greater than the maximum supply power that the second power supply unit 110 is capable of outputting to the electronic device 200, the fourth predetermined value may be set depending on the maximum supply power that the second power supply unit 110 is capable of outputting to the electronic device 200. In a case where it is determined in S514 that the requested power is equal to or greater than the fourth predetermined value (Yes in S514), the processing flow proceeds from S514 to S502. In a case where it is not determined that the requested power is equal to or greater than the fourth predetermined value (No in S514), the processing flow proceeds from S514 to S515.

Other Embodiments

In the present invention, the power supply apparatus is not limited to the power supply apparatus 100 according to the first embodiment described above. For example, the invention may be applied to a system including a plurality of apparatuses.

The processes and functions described above in the first embodiment may be realized by a computer program. In this case, the processes according to the present invention are executed by the computer program thereby realizing the functions according to the first embodiment described above.

The computer program described above may use an operating system (OS) or the like running on a computer to realize one or more of processes and functions according to the first embodiment described above.

In the present invention, the computer program may be read from a computer-readable storage medium and may be executed by a computer. As for the computer-readable medium, various kinds of storage media may be used such as a hard disk, an optical disk, a CD-ROM disk, a CD-R disk, a memory card, a ROM, and the like. In the present invention, the computer program may be provided to a computer from an external apparatus via a communication interface and may be executed by the computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-284436, filed Dec. 27, 2012, which is hereby incorporated by reference herein in its entirety.

REFERENCE SIGNS LIST 100 power supply apparatus
200 electronic device

The invention claimed is:

1. A power supply apparatus comprising:
   a first power supply unit configured to wirelessly supply power based on a first power supply method;
   a second power supply unit configured to wirelessly supply power based on a second power supply method different from the first power supply method;
   a communication unit configured to communicate with an electronic device; and
   a control unit configured to select one of the first power supply unit and the second power supply unit, based on a communication with the electronic device, before starting wirelessly supplying power,
   wherein the control unit is configured to perform a process to wirelessly supply power to the electronic device using the power supply unit selected by the control unit, and
   wherein the control unit performs control to re-select, based on a power receiving state of the electronic device, after starting wirelessly supplying power using the first power supply unit or the second power supply unit, one of the first power supply unit and the second power supply unit.

2. The power supply apparatus according to claim 1, wherein the control unit selects one of the first power supply unit and the second power supply unit according to a command from the electronic device.

3. The power supply apparatus according to claim 1, wherein in a case where a command to request the first power supply method is issued by the electronic device, the control unit selects the first power supply unit.

4. The power supply apparatus according to claim 1, wherein in a case where a command to request the second power supply method is issued by the electronic device, the control unit selects the second power supply unit.

5. The power supply apparatus according to claim 1 wherein the control unit selects one of the first power supply unit and the second power supply unit according to power requested by the electronic device.

6. The power supply apparatus according to claim 1, wherein in a case where the power requested by the electronic device is equal to or greater than a predetermined value, the control unit selects the second power supply unit.

7. The power supply apparatus according to claim 1, wherein the control unit makes a comparison between a first power supply capacity of the first power supply unit and a second power supply capacity of the second power supply unit and selects one of the first power supply unit and the second power supply unit according to a result of the comparison.

8. The power supply apparatus according to claim 7, wherein in a case where the second power supply capacity is equal to or greater than the first power supply capacity, the control unit selects the second power supply unit.

9. The power supply apparatus according to claim 1, wherein the control unit makes a comparison between a first received power received by the electronic device from the first power supply unit and a second received power received by the electronic device from the second power supply unit, and the control unit selects one of the first power supply unit and the second power supply unit according to a result of the comparison.

10. The power supply apparatus according to claim 9, wherein in a case where the second received power is equal to or greater than the first received power, the control unit selects the second power supply unit.

11. The power supply apparatus according to claim 1, wherein the control unit selects either one of the first power supply unit and the second power supply unit according to whether a command to perform a particular process is input to the power supply apparatus.

12. The power supply apparatus according to claim 1, wherein in a case where a command to perform a particular process is input to the power supply apparatus, the control unit selects the second power supply unit.

13. The power supply apparatus according to claim 11, wherein the particular process includes a process different from a process of performing a communication to control a wireless power supply.

14. The power supply apparatus according to claim 1, wherein in a case where an increase occurs in the power requested by the electronic device, the control unit controls to again select one of the first power supply unit and the second power supply unit.

15. The power supply apparatus according to claim 1, wherein in a case where a reduction occurs in the power received by the electronic device from the power supply apparatus, the control unit controls to again select one of the first power supply unit and the second power supply unit.

16. The power supply apparatus according to claim 1, wherein the communication unit communicates with the electronic device based on a near field communication (NFC) standard.

17. The power supply apparatus according to claim 1, wherein the first power supply method is a method of wirelessly supplying power using a first frequency, and the second power supply method is a method of wirelessly supplying power using a second frequency different from the first frequency.

18. The power supply apparatus according to claim 1, wherein the first power supply method is a method of wirelessly supplying power using magnetic resonance, and the second power supply method is a method of wirelessly supplying power using electromagnetic induction.

19. The power supply apparatus according to claim 1, wherein the first power supply method is a method of wirelessly supplying power according to a near field communication (NFC) standard, and the second power supply method is a method of wirelessly supplying power according to a Qi standard.

20. A control method for a computer having a first power supply unit, a second power supply unit, and a communication unit, the control method comprising:
   wirelessly supplying power based on a first power supply method via the first power supply unit;
   wirelessly supplying power based on a second power supply method different from the first power supply method via the second power supply unit;
   communicating with an electronic device via the communication unit;
   selecting one of the first power supply unit and the second power supply unit, based on a communication with the electronic device, after starting wirelessly supplying power;
   performing a process to wirelessly supply power to the electronic device using the selected power supply unit selected in the selecting step; and
   re-selecting, based on a power receiving state of the electronic device, after starting wirelessly supplying power using the first power supply unit or the second power supply unit, one of the first power supply unit and the second power supply unit.

21. A non-transitory computer-readable storage medium storing a program configured to control a computer to execute a process comprising:
   wirelessly supplying power based on a first power supply method;
   wirelessly supplying power based on a second power supply method different from the first power supply method;
   communicating with an electronic device;
   selecting one of the first power supply method and the second power supply method, based on a communication with the electronic device, after starting wirelessly supplying power;
   performing a process to wirelessly supply power to the electronic device using the selected power supply method; and
   re-selecting, based on a power receiving state of the electronic device, after starting wirelessly supplying power based on the first power supply method or the second power supply method, one of the first power supply method and the second power supply method.

* * * * *